(12) United States Patent
Humes

(10) Patent No.: US 11,815,047 B2
(45) Date of Patent: Nov. 14, 2023

(54) CENTRIFUGAL COMPRESSOR ASSEMBLY FOR A GAS TURBINE ENGINE WITH DESWIRLER HAVING SEALING FEATURES

(71) Applicant: Rolls-Royce North American Technologies, Inc., Indianapolis, IN (US)

(72) Inventor: Ryan C. Humes, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 17/880,221

(22) Filed: Aug. 3, 2022

(65) Prior Publication Data

US 2022/0372931 A1 Nov. 24, 2022

Related U.S. Application Data

(62) Division of application No. 16/928,586, filed on Jul. 14, 2020, now Pat. No. 11,441,516.

(51) Int. Cl.

| F04D 29/44 | (2006.01) |
|---|---|
| F02K 3/02 | (2006.01) |
| F02C 7/18 | (2006.01) |
| F01D 15/00 | (2006.01) |
| F04D 1/00 | (2006.01) |
| F01D 5/00 | (2006.01) |

(52) U.S. Cl.
CPC ............. *F02K 3/025* (2013.01); *F01D 5/00* (2013.01); *F01D 15/00* (2013.01); *F02C 7/18* (2013.01); *F04D 1/00* (2013.01); *F04D 29/44* (2013.01); *F05D 2220/36* (2013.01)

(58) Field of Classification Search
CPC ... F02C 3/08; F01D 5/10; F04D 29/44; F04D 29/442; F04D 29/444
See application file for complete search history.

(56) References Cited

U.S. PATENT DOCUMENTS

| 2,419,669 A | 4/1947 | Rudolph |
|---|---|---|
| 2,609,141 A | 9/1952 | George |
| 2,662,553 A | 12/1953 | Albert |
| 2,967,013 A | 1/1961 | Frederick et al. |
| 3,644,055 A | 2/1972 | Davis |
| 3,719,430 A | 3/1973 | Blair et al. |
| 3,860,360 A | 1/1975 | Yu |
| 3,861,826 A | 1/1975 | Dean |
| 3,876,328 A | 4/1975 | Exley |
| 3,905,721 A | 9/1975 | Fitzpatrick |

(Continued)

FOREIGN PATENT DOCUMENTS

| FR | 2922939 | 5/2009 |
|---|---|---|
| FR | 3024887 | 12/2018 |

(Continued)

*Primary Examiner* — Thuyhang N Nguyen
(74) *Attorney, Agent, or Firm* — Barnes & Thornburg LLP

(57) ABSTRACT

A compressor adapted for use in for a gas turbine engine includes a diffuser and a housing. The diffuser is arranged circumferentially around an axis and includes a fore plate, an aft plate spaced apart axially from the fore plate to define a flow path therebetween, and a plurality of vanes that extend between the fore plate and the aft plate. The housing is arranged circumferentially about the axis and located adjacent the diffuser.

15 Claims, 3 Drawing Sheets

(56) References Cited

U.S. PATENT DOCUMENTS

| | | | |
|---|---|---|---|
| 3,936,223 A | 2/1976 | Baghdadi | |
| 4,027,997 A | 6/1977 | Bryans | |
| 4,100,732 A | 7/1978 | Bryans et al. | |
| 4,344,737 A | 8/1982 | Liu | |
| 4,349,314 A | 9/1982 | Erwin | |
| 4,431,374 A | 2/1984 | Benstein et al. | |
| 4,576,550 A | 3/1986 | Bryans | |
| 4,824,325 A | 4/1989 | Bandukwalla | |
| 4,877,373 A | 10/1989 | Bandukwalla | |
| 4,938,661 A | 7/1990 | Kobayashi et al. | |
| 5,178,516 A | 1/1993 | Nakagawa et al. | |
| 5,316,441 A | 5/1994 | Osborne | |
| 5,362,203 A | 11/1994 | Brasz | |
| 5,555,721 A * | 9/1996 | Bourneuf | F02C 7/18 |
| | | | 415/115 |
| 5,564,898 A | 10/1996 | Richards et al. | |
| 5,704,211 A | 1/1998 | Hatfield | |
| 6,123,506 A | 9/2000 | Brand et al. | |
| 6,155,779 A | 12/2000 | Watanabe et al. | |
| 6,279,322 B1 | 8/2001 | Moussa | |
| 6,280,139 B1 | 8/2001 | Romani et al. | |
| 6,442,940 B1 | 9/2002 | Young et al. | |
| 6,471,475 B1 | 10/2002 | Sasu et al. | |
| 6,540,481 B2 | 4/2003 | Moussa et al. | |
| 6,554,569 B2 | 4/2003 | Decker et al. | |
| 6,589,015 B1 | 7/2003 | Roberts et al. | |
| 6,695,579 B2 | 2/2004 | Meng | |
| 6,834,501 B1 | 12/2004 | Vrbas et al. | |
| 7,025,566 B2 | 4/2006 | Sasu et al. | |
| 7,032,383 B2 | 4/2006 | Weber | |
| 7,094,024 B2 | 8/2006 | Nguyen et al. | |
| 7,101,151 B2 | 9/2006 | Loringer et al. | |
| 7,156,618 B2 | 1/2007 | Fish et al. | |
| 7,407,367 B2 | 8/2008 | McAuliffe et al. | |
| 7,442,006 B2 | 10/2008 | Nguyen et al. | |
| 7,448,852 B2 | 11/2008 | Abdel et al. | |
| 7,500,364 B2 | 3/2009 | Schumacher et al. | |
| 7,717,672 B2 | 5/2010 | Barton et al. | |
| 7,798,777 B2 | 9/2010 | Moussa et al. | |
| 7,827,798 B2 | 11/2010 | Commaret et al. | |
| 7,862,295 B2 | 1/2011 | Daguenet | |
| 7,871,243 B2 | 1/2011 | Chen et al. | |
| 7,908,869 B2 * | 3/2011 | Ivakitch | F01D 25/246 |
| | | | 415/173.1 |
| 7,955,051 B2 | 6/2011 | Daguenet et al. | |
| 8,006,497 B2 | 8/2011 | Nolcheff et al. | |
| 8,016,557 B2 | 9/2011 | Abdel et al. | |
| 8,038,392 B2 | 10/2011 | Honda et al. | |
| 8,047,777 B2 | 11/2011 | Commaret et al. | |
| 8,087,491 B2 | 1/2012 | Merchant et al. | |
| 8,127,551 B2 | 3/2012 | Commaret et al. | |
| 8,142,148 B2 | 3/2012 | Hernandez et al. | |
| 8,147,186 B2 | 4/2012 | Ibaraki et al. | |
| 8,162,604 B2 | 4/2012 | Kuhnel et al. | |
| 8,231,341 B2 | 7/2012 | Anderson et al. | |
| 8,287,236 B2 | 10/2012 | Nishida et al. | |
| 8,425,188 B2 | 4/2013 | Dovbush et al. | |
| 8,438,854 B2 | 5/2013 | Nolcheff | |
| 8,505,305 B2 | 8/2013 | Ziaei et al. | |
| 8,511,981 B2 | 8/2013 | Small et al. | |
| 8,540,484 B2 | 9/2013 | Hollman et al. | |
| 8,585,348 B2 | 11/2013 | Lin et al. | |
| 8,616,841 B2 | 12/2013 | Johnson | |
| 8,616,843 B2 | 12/2013 | Shibata et al. | |
| 8,839,625 B2 | 9/2014 | Napier et al. | |
| 9,228,497 B2 | 1/2016 | Ottow et al. | |
| 9,291,171 B2 | 3/2016 | Bunel et al. | |
| 9,409,228 B2 | 8/2016 | Renard et al. | |
| 9,512,733 B2 | 12/2016 | Lombard et al. | |
| 9,581,170 B2 | 2/2017 | Holbrook | |
| 9,631,814 B1 | 4/2017 | Barton et al. | |
| 9,726,032 B2 | 8/2017 | Ress et al. | |
| 9,874,220 B2 | 1/2018 | Adams | |
| 10,208,628 B2 | 2/2019 | Nasir et al. | |
| 10,330,121 B2 | 6/2019 | Reynolds et al. | |
| 10,352,237 B2 | 7/2019 | Mazur et al. | |
| 10,544,693 B2 | 1/2020 | Nasir et al. | |
| 11,441,516 B2 * | 9/2022 | Humes | F01D 15/00 |
| 2005/0158173 A1 | 7/2005 | Nguyen et al. | |
| 2005/0163610 A1 | 7/2005 | Higashimori | |
| 2007/0036646 A1 * | 2/2007 | Nguyen | F04D 29/4206 |
| | | | 415/208.3 |
| 2007/0183890 A1 | 8/2007 | Nolcheff et al. | |
| 2008/0069690 A1 | 3/2008 | Ivakitch et al. | |
| 2010/0181734 A1 | 7/2010 | Halling | |
| 2012/0167595 A1 * | 7/2012 | Ottow | F04D 29/584 |
| | | | 415/208.1 |
| 2012/0272663 A1 | 11/2012 | Moussa et al. | |
| 2013/0202482 A1 | 8/2013 | Froimson | |
| 2014/0248142 A1 * | 9/2014 | Ress, Jr. | F02C 3/08 |
| | | | 415/207 |
| 2016/0003149 A1 | 1/2016 | Suciu et al. | |
| 2016/0061212 A1 | 3/2016 | Mokulys et al. | |
| 2016/0061219 A1 | 3/2016 | Mokulys et al. | |
| 2016/0115971 A1 | 4/2016 | Duong et al. | |
| 2016/0281729 A1 * | 9/2016 | Peer | F04D 29/083 |
| 2017/0102005 A1 | 4/2017 | Schuldt et al. | |
| 2017/0248155 A1 | 8/2017 | Parker et al. | |
| 2017/0292536 A1 | 10/2017 | Konig | |
| 2017/0362947 A1 | 12/2017 | Nasir et al. | |
| 2018/0135516 A1 | 5/2018 | Nasir et al. | |
| 2018/0216629 A1 | 8/2018 | Benetschik et al. | |
| 2018/0258959 A1 | 9/2018 | Honda et al. | |
| 2018/0274376 A1 | 9/2018 | King et al. | |
| 2019/0162191 A1 | 5/2019 | Lesser et al. | |
| 2019/0226493 A1 | 7/2019 | Choi et al. | |
| 2019/0264705 A1 | 8/2019 | Higashimori et al. | |

FOREIGN PATENT DOCUMENTS

| | | |
|---|---|---|
| GB | 702773 A | 1/1954 |
| WO | 2016001364 | 1/2016 |
| WO | 2017129342 | 8/2017 |
| WO | 2018205631 | 11/2018 |
| WO | 2019063384 | 4/2019 |

* cited by examiner

CENTRIFUGAL COMPRESSOR ASSEMBLY FOR A GAS TURBINE ENGINE WITH DESWIRLER HAVING SEALING FEATURES

CROSS REFERENCE TO RELATED APPLICATIONS

This application is a divisional of and claims priority to and the benefit of U.S. patent application Ser. No. 16/928,586, filed 14 Jul. 2020, the disclosure of which is now expressly incorporated herein by reference.

FIELD OF THE DISCLOSURE

The present disclosure relates generally to gas turbine engines, and more specifically to centrifugal compressors for use in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors may include axial and centrifugal compression stages to compress the air drawn in to the engine. Centrifugal compressors use a rotating impeller device to increase kinetic energy in the flow path air and convert the kinetic energy into potential energy in the form of pressure as the impeller forces the air radially outward. Centrifugal compressors may also include a diffuser that delivers air from the compressor to the combustor. The diffuser is located radially outward of the exit of the impeller to decelerate the air delivered from the impeller smoothly to recover static pressure.

SUMMARY

The present disclosure may comprise one or more of the following features and combinations thereof.

A compressor adapted for use in for a gas turbine engine may include an impeller, a diffuser, and a housing. The impeller may be configured to rotate about an axis to provide compressed air. The diffuser may be arranged circumferentially around the impeller and configured to diffuse the compressed air received from the impeller. The housing may be arranged circumferentially about the axis and located adjacent the diffuser.

In some embodiments, the diffuser may include a diffuser body and a locating baffle. The diffuser body may be aligned axially with an outlet of the impeller to capture the compressed air. The locating baffle may be fixed with the diffuser body for movement with the diffuser body.

In some embodiments, the diffuser body may include a fore plate, an aft plate, and a plurality of vanes. The aft plate may be spaced apart axially from the fore plate to define a flow path. The flow path may be configured to receive the compressed air from the impeller. The plurality of vanes may extend between the fore plate and the aft plate to interact with the compressed air flowing through the diffuser body.

In some embodiments, the locating baffle may be engaged with a first portion of the housing and may urge the diffuser body away from the first portion of the housing and toward a second portion of the housing. The locating baffle may be configured to deform elastically to allow the diffuser body to move relative to the first portion of the housing and the second portion of the housing during use of the compressor.

In some embodiments, the locating baffle may comprise sheet metal arranged to form a diaphragm spring feature. The diaphragm spring feature may be configured to deform elastically to allow the diffuser body to move relative to the first portion of the housing and the second portion of the housing during use of the compressor.

In some embodiments, the locating baffle may be coupled with the first portion of the housing for movement with the first portion of the housing. The movement of the locating baffle may be physically limited axially and radially by the housing. In some embodiments, movement of the locating baffle may be physically limited axially, radially, and circumferentially by the housing.

In some embodiments, movement of the diffuser body may be limited axially and radially by the housing without the diffuser being coupled directly with the housing so that force loads acting on the housing are not transmitted to the diffuser. In some embodiments, movement of the diffuser body may be limited axially, radially, and circumferentially by the housing without the diffuser being coupled directly with the housing.

In some embodiments, the first portion of the housing comprises an outer case arranged circumferentially around the impeller. The second portion of the housing may comprise at least one of a radially extending inner combustor case adapted to define a portion of a combustion chamber and a shroud arranged around the impeller.

In some embodiments, the locating baffle may be fixed to a radial outer end of the diffuser body, extend forward away from the diffuser body, and is fastened with the outer case. In some embodiments, the locating baffle may be fixed to a radial inner end of the diffuser body and extend radially outward toward a radial outer end of the diffuser body.

In some embodiments, the locating baffle may be annular and solid to form a gas seal between the diffuser body and the first portion of the housing. In some embodiments, the diffuser may further include a seal engaged with the diffuser body and the second portion of the housing.

According to another aspect of the present disclosure, a compressor adapted for use in for a gas turbine engine may include a diffuser and a housing. The diffuser may be arranged circumferentially around an axis. The housing may be arranged circumferentially about the axis and located adjacent the diffuser.

In some embodiments, the diffuser may include a diffuser body and a locating baffle. The diffuser body may include a fore plate, an aft plate spaced apart axially from the fore plate to define a flow path, and a plurality of vanes that extend between the fore plate and the aft plate. The locating baffle may be configured to deform elastically to allow the diffuser body to move relative to the housing. The locating baffle may be engaged with a first portion of the housing to bias the diffuser body away from the first portion of the housing and toward a second portion of the housing.

In some embodiments, the locating baffle may include a curved portion that defines a diaphragm. The diaphragm may be configured to deform elastically. In some embodiments, at least the curved portion of the locating baffle comprises sheet metal.

In some embodiments, the locating baffle may be coupled with the first portion of the housing. The locating baffle may be coupled with the first portion of the housing for movement with the first portion of the housing.

In some embodiments, the first portion of the housing may include fore outer case and an aft outer case. The locating baffle may be fastened between the fore outer case and the aft outer case.

In some embodiments, movement of the diffuser may be limited axially and radially by the housing without the diffuser being coupled directly with the housing. Movement of the diffuser may be limited axially and radially by the housing without the diffuser being coupled directly with any other component.

In some embodiments, the locating baffle may include a fixed end and a free end. The fixed end may be fixed with the diffuser body. The free end may be spaced apart from the fixed end. The free end may be free to move relative to the diffuser body and the housing.

In some embodiments, the first portion of the housing may comprise an outer case arranged circumferentially around the impeller. The second portion of the housing may comprise at least one of a radially extending inner combustor case adapted to define a portion of a combustion chamber and a shroud arranged around the impeller.

According to another aspect of the present disclosure, a method may include providing an impeller, a diffuser, and a housing. The impeller may be configured to rotate about an axis to provide compressed air. The diffuser may be configured to diffuse the compressed air received from the impeller.

In some embodiments, the diffuser may include a diffuser body and a locating baffle. The locating baffle may be configured to deform elastically.

In some embodiments, the method may further include fixing a first end of the locating baffle to the diffuser body for movement with the diffuser body and arranging the diffuser circumferentially around the impeller. The diffuser may be arranged circumferentially around the impeller so that the diffuser body is aligned axially with an outlet of the impeller, In some embodiments, the method may further include arranging the housing adjacent to the diffuser and engaging a second end of the locating baffle with a first portion of the housing. The second end of the locating baffle may be engaged with the first portion of the housing to bias the diffuser body away from the first portion of the housing and toward a second portion of the housing.

In some embodiments, the locating baffle may be fixed to a radial outer end of the diffuser body, extend forward away from the diffuser body, and is fastened with the first portion of the housing. In some embodiments, the locating baffle may be fixed to a radial inner end of the diffuser body and extend radially outward toward a radial outer end of the diffuser body.

These and other features of the present disclosure will become more apparent from the following description of the illustrative embodiments.

DETAILED DESCRIPTION OF THE DRAWINGS

Figure 1:
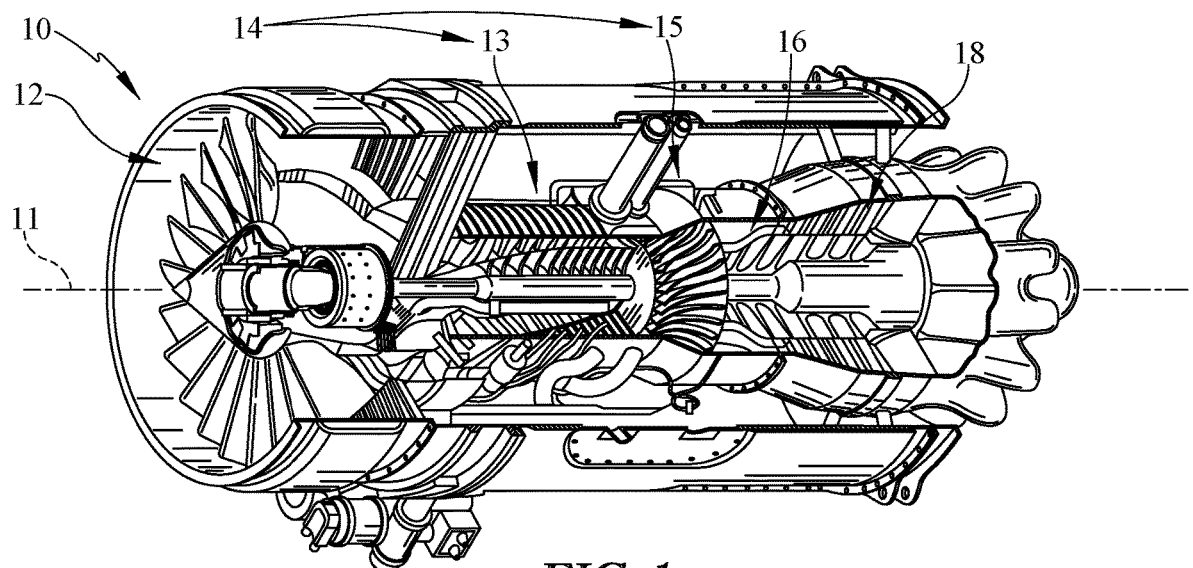
FIG. 1 is a cut away perspective view of a gas turbine engine showing the engine includes a fan, an axi-centrifugal compressor, a combustor fluidly coupled to the compressor, and a turbine fluidly coupled to the combustor.

For the purposes of promoting an understanding of the principles of the disclosure, reference will now be made to a number of illustrative embodiments illustrated in the drawings and specific language will be used to describe the same.

An illustrative gas turbine engine 10 includes a fan 12, an axi-centrifugal compressor 14, a combustor 16 fluidly coupled to the compressor 14, and a turbine 18 fluidly coupled to the combustor 16 as shown in FIG. 1. The fan 12 is driven by the turbine 18 and provides thrust for propelling an aircraft. The compressor 14 compresses gases and delivers the compressed gases to the combustor 16. The combustor 16 mixes fuel with the compressed gases and ignites the fuel to produce hot, high pressure combustion products. The hot, high pressure combustion products of the combustion reaction in the combustor 16 are directed into the turbine 18 to cause the turbine 18 to rotate about an axis 11 of the gas turbine engine 10. The turbine 18 extracts mechanical work from the hot, high pressure combustion products to drive the compressor 14 and the fan 12. In other embodiments, the fan 12 may be omitted and a drive shaft or propeller is driven by the turbine 18.

Figure 2:
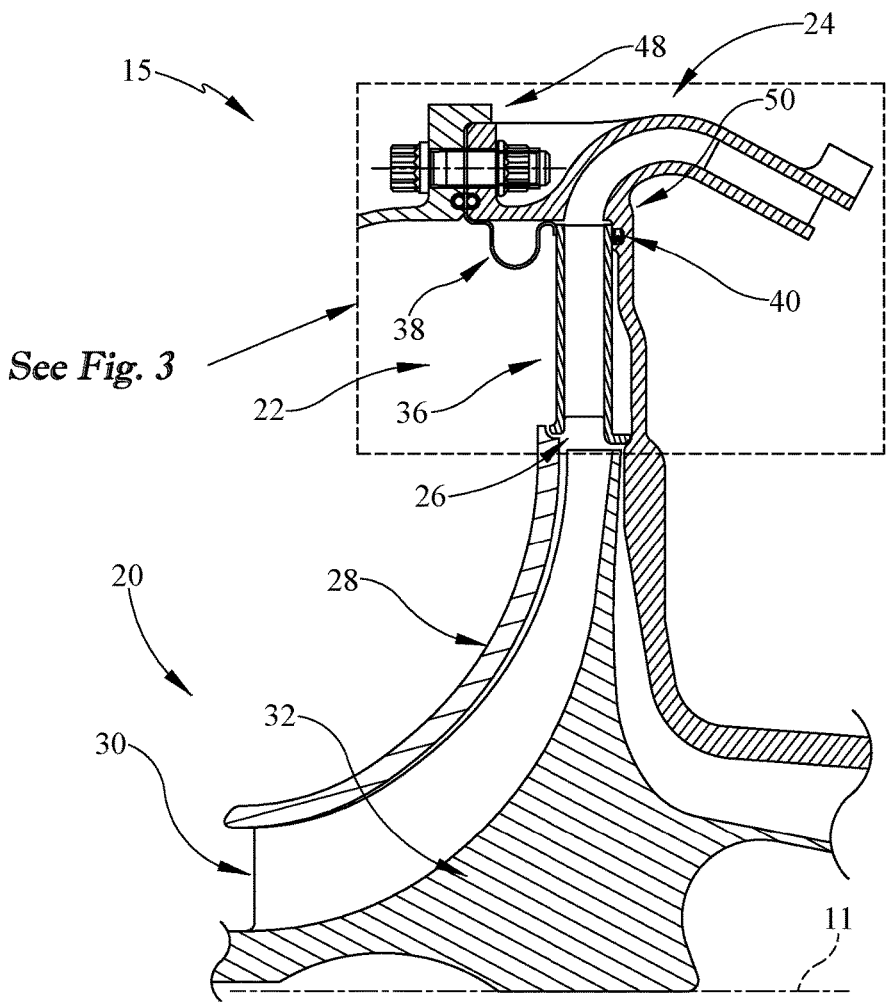
FIG. 2 is a cross-section view of the gas turbine engine of FIG. 1 showing the axi-centrifugal compressor has a centrifugal compression stage that includes an impeller mounted for rotation about an axis of the gas turbine engine to provide compressed air, a diffuser arranged circumferentially around the impeller to diffuse the compressed air received from the impeller, and a housing arranged circumferentially about the axis adjacent the diffuser.
Figure 3:
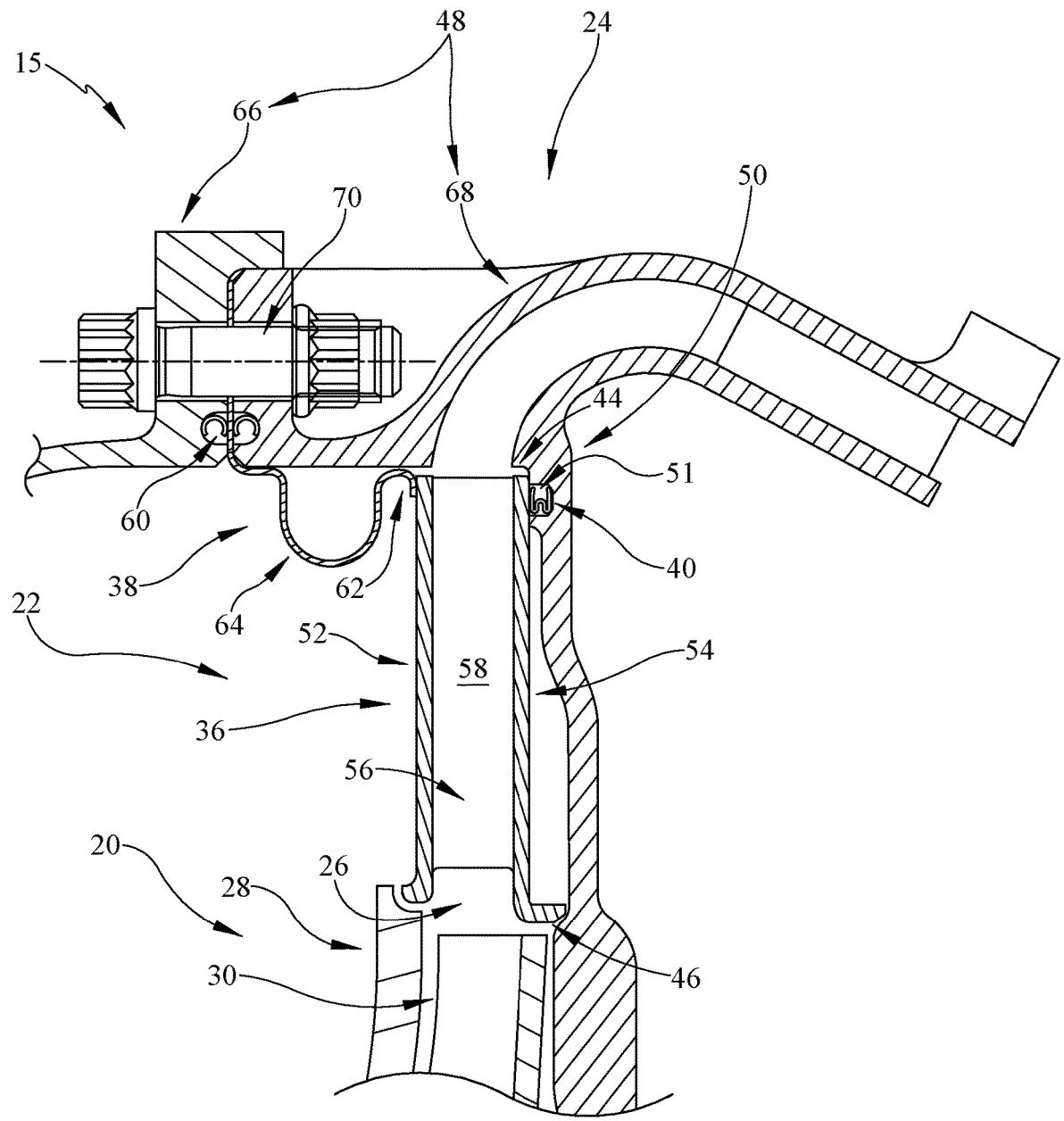
FIG. 3 is a detail view of FIG. 2 showing the diffuser includes a diffuser body aligned with an outlet of the impeller to capture the compressed air and a locating baffle that extends between the housing and the diffuser body to retain the axial, radial, and circumferential position of the diffuser body relative to the housing during use of the compressor.

The axi-centrifugal compressor 14 has axial compression stages 13 and a centrifugal compression stage 15 as shown in FIG. 1. The axial compression stages 13 each include a rotating bladed wheel assembly that are separated by vane assemblies. The centrifugal compression stage 15 includes an impeller 20, a diffuser 22, and a housing 24 as shown in FIGS. 2 and 3. The impeller 20 is mounted for rotation about the axis 11 and formed to have impeller blades 30 that each extend from an impeller disk 32. The diffuser 22 is arranged circumferentially around the impeller 20 and is configured to diffuse the compressed air received from the impeller 20 and conduct the air to the combustor 16. The housing 24 is arranged circumferentially about the axis 11 and is located adjacent the diffuser 22.

The diffuser 22 includes a diffuser body 36 and a locating baffle 38 as shown in FIGS. 2 and 3. The diffuser body 36 is aligned axially with an outlet 26 of the impeller 20 to capture the compressed air. The locating baffle 38 is fixed with the diffuser body 36 for movement with the diffuser body 36 in the illustrative embodiment.

In the illustrative embodiment, the locating baffle 38 is coupled with the housing 24 and configured to retain the axial, radial, and circumferential position of the diffuser body 36 relative to the housing 24. The locating baffle 38 extends between and interconnects the diffuser body 36 and the housing 24 such that the diffuser body 36 is blocked or limited in movement axially, radially, or circumferentially by the housing 24 without the diffuser 22 being rigidly coupled directly with the housing 24. In this way, the force loads acting on the housing 24 are not transmitted to the diffuser 22.

Typically, a diffuser is rigidly mounted relative to the housing 24. In some embodiments, the diffuser may be trapped between other structural components to restrain the diffuser axially, radially, and circumferentially. Such rigidly mounted diffusers therefore receive aerodynamic loads from the compressed air received from the impeller 20 as well as structural loads from the housing 24 such as force loads from the combustion chamber of the combustor 16 acting on the housing 24.

To minimize the structural loads and stresses driven through the diffuser 22, the locating baffle 38 is configured to elastically deform to allow the diffuser body 36 to move relative to the housing 24 during use of the compressor 15. The locating baffle 38 is engaged with a first portion 48 of the housing 24 to urge the diffuser body 36 away from the first portion 48 of the housing 24 and toward a second portion 50 of the housing 24. The locating baffle 38 biases the diffuser body 36 into the appropriate position relative to the impeller 20 without rigidly coupling the diffuser body 36 to the housing 24 or other structural components.

The locating baffle 38 comprises sheet metal shaped to include a first fixed end 60, a second fixed end 62 spaced apart from the first end 60, and a curved portion 64 extending between the interconnecting the two ends 60, 62 as shown in FIG. 3. The first fixed end 60 is trapped between fore and aft case portions 66, 68 included in the first portion 48 of the housing 24, while the second fixed end 62 is fixed to the diffuser body 36. The curved portion 64 of the locating baffle 38 forms a diaphragm spring feature 64 that is configured to deform elastically to allow the diffuser body 36 to move relative to the first and second portions 48, 50 of the housing 24 during use of the compressor 15.

In the illustrative embodiment, the ends 60, 62 and the curved portion 64 comprise sheet metal. In other embodiments, at least the curved portion 64 of the locating baffle 38 comprises sheet metal.

The locating baffle 38 is annular and solid in the illustrative embodiments. The solid locating baffle 38 forms a gas seal between the diffuser body 36 and the first portion 48 of the housing 24.

In the illustrative embodiment, the diffuser 22 further includes a seal 40 as shown in FIGS. 2 and 3. The seal 40 is arranged in a slot 51 formed in the second portion 50 of the housing 24 so as to be engaged with the diffuser body 36 and the second portion 50 of the housing 24 opposite the locating baffle 38. Together the seal 40 and the locating baffle 38 seal between the diffuser body 36 and the housing 24.

Turning again to the diffuser body 36, the diffuser body 36 includes a fore plate 52, an aft plate 54, and a plurality of vanes 56 as shown in FIG. 3. The fore plate 52 and aft plate 54 extend radially between a radial outer end 44 and a radial inner end 46. The aft plate 54 is spaced apart axially from the fore plate 52 to define a flow path 58 therebetween. The flow path 58 is configured to receive the compressed air from the impeller 20 at the radial inner end 46 of the diffuser 22 and discharge the diffused air at the radial outer end 44 of the diffuser 22. The plurality of vanes 56 extend between the fore plate 52 and the aft plate 54 to interact with the compressed air flowing through the diffuser body 36.

In the illustrative embodiment, the second fixed end 62 of the locating baffle 38 is fixed to the fore plate 52 at the radial outer end 44 of the diffuser body 36 as shown in FIG. 3. In other embodiments, the second end 62 may be fixed at another radial location on the fore plate 52 of the diffuser body 36. In some embodiments, the locating baffle 38 is not fixed to the diffuser body 36.

In the illustrative embodiment, the second end 62 is brazed to the fore plate 52 of the diffuser body 36. In some embodiments, the second end 62 of the locating baffle 38 may be welded to the fore plate 52 of the diffuser body 36. In other embodiments, the second end 62 of the locating baffle 38 may be fixed to the fore plate 52 of the diffuser body 36 using another suitable fastener or bonding method.

In the illustrative embodiment, the first portion 48 of the housing 24 comprises an outer case 48 arranged circumferentially around the impeller 20. The outer case 48 is shaped to include a fore outer case portion 66 and an aft outer case portion 68 as shown in FIG. 3. The fore and aft outer case portions 66, 68 are fastened together with a fastener 70. The fastener 70 extends through the fore outer case 66 and the aft outer case 68 with the first fixed end 60 of the locating baffle 38 arranged axially therebetween to couple the locating baffle 38 to the outer case 48.

The locating baffle 38 is coupled with the first portion 48 of the housing 24 for movement with the first portion 48. In this way, movement of the locating baffle 38 is physically limited axially and radially by the housing 24. In the illustrative embodiment, the first end 60 of the locating baffle 38 is coupled between the fore and aft outer case portions 66, 68 and blocks circumferential rotation of the locating baffle 38. In turn, the blocked circumferential rotation of the locating baffle 38 by the housing 24 blocks or limits circumferential rotation of the diffuser body 36 relative to the housing 24.

In the illustrative embodiment, the second portion 50 of the housing 24 comprises a radially extending inner combustor case 50 as shown in FIGS. 2 and 3. The inner combustor case 50 is adapted to define a portion of a combustion chamber included in the combustor 16 of the gas turbine engine 10. In other embodiments, the second portion 50 may be another portion of the compressor 15. For example, the second portion 50 may include the shroud of the impeller or the deswirler located radially outward of the diffuser 22.

In the illustrative embodiment, the impeller 20 further includes a shroud 28 as shown in FIGS. 2 and 3. The shroud 28 extends around the impeller blades 30 to restrict gasses from moving over the impeller blades 30 without interacting with the impeller blades 30. The shroud 28 and the combustor case 50 may engage the radial inner end 46 of the diffuser body 36 to block or limit radial inward movement of the diffuser body 36 in the illustrative embodiment.

A method of assembling and using the compressor 15 may include several steps. To begin, the diffuser 22 may be assembled by fixing the locating baffle 38 to the diffuser body 36 for movement therewith. In the illustrative embodiment, the first end 60 is fixed to the fore plate 52 at the radial outer end 44 of the diffuser body 36. In other embodiments, the first end 60 may be fixed to fore plate 52 at another location along the radial length of the diffuser body 36.

The method may include brazing the first end 60 of the locating baffle 38 to the fore plate 52 in some embodiments. In other embodiments, the method may include welding the first end 60 of the locating baffle 38 to the fore plate 52.

Once the locating baffle 38 is fixed with the diffuser body 36, the diffuser 22 may be arranged around the impeller 20. The diffuser 22 is circumferentially arranged around the impeller 20 so that the diffuser body 36 is aligned axially with the outlet 26 of the impeller 20. The diffuser 22 is positioned with the radial inner end 46 adjacent to the outlet 26 of the impeller 20.

With the diffuser 22 in place, the housing 24 may be arranged adjacent to the diffuser 22. In the illustrative embodiment, the aft plate 54 of the diffuser body 36 is arranged adjacent to the combustor case 50.

Before the housing 24 is arranged around the diffuser 22, the seal 40 may be arranged in the slot 51 formed in the combustor case 50. As the housing 24 is assembled, bringing the combustor case 50 adjacent to the aft plate 54 of the diffuser 22, the seal 40 engages the aft plate 54 of the diffuser body 36.

Then the second end 62 of the locating baffle 38 is engaged with the outer case 48 of the housing 24 to bias the diffuser body 36 away from the outer case 48 of the housing 24 and toward the combustor case 50 of the housing 24. In the illustrative embodiment, the diffuser body 36 is biased toward the combustor case 50 to engage with the seal 40. The second end 62 of the locating baffle 38 is arranged between the fore and aft outer case portions 66, 68 before the fastener 70 is inserted.

The fastener 70 is then inserted through the fore outer case 66, the second end 62 of the locating baffle 38, and the aft outer case 68 to couple the locating baffle 38 with the housing 24. The fastener 70 is then secured so that the locating baffle 38 is coupled with the first portion 48 of the housing 24 for movement with the first portion 48. In this way, movement of the locating baffle 38 is physically limited axially and radially by the housing 24.

Figure 4:
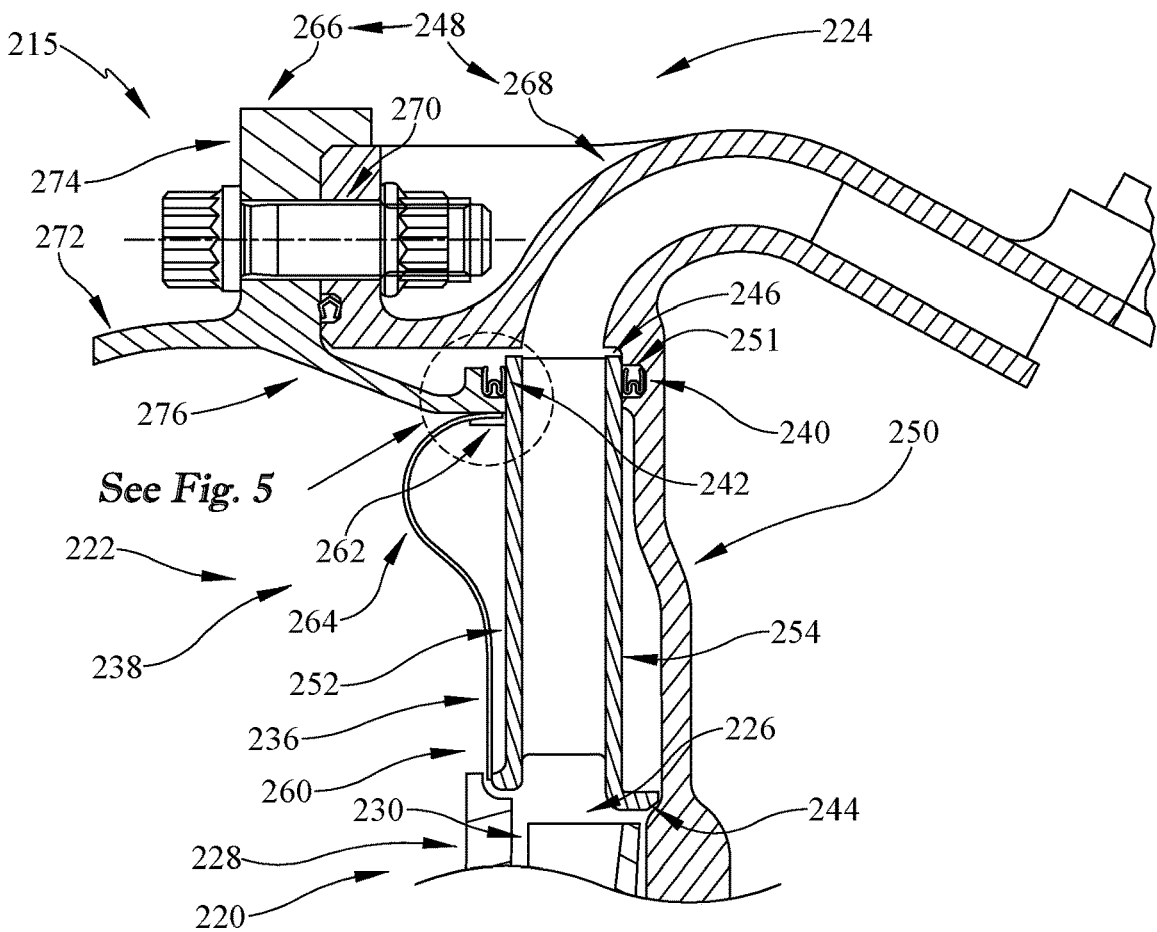
FIG. 4 is a cross-section view of another embodiment of a diffuser adapted for use in the centrifugal compressor included in the gas turbine engine of FIG. 1 showing the diffuser includes a diffuser body aligned with an outlet of the impeller to capture the compressed air and a locating baffle extending between radial inner and outer ends of the diffuser body, the locating baffle engaging the housing to retain the radial position of the diffuser body relative to the housing during use of the compressor without the diffuser body being directly coupled to the housing.
Figure 5:
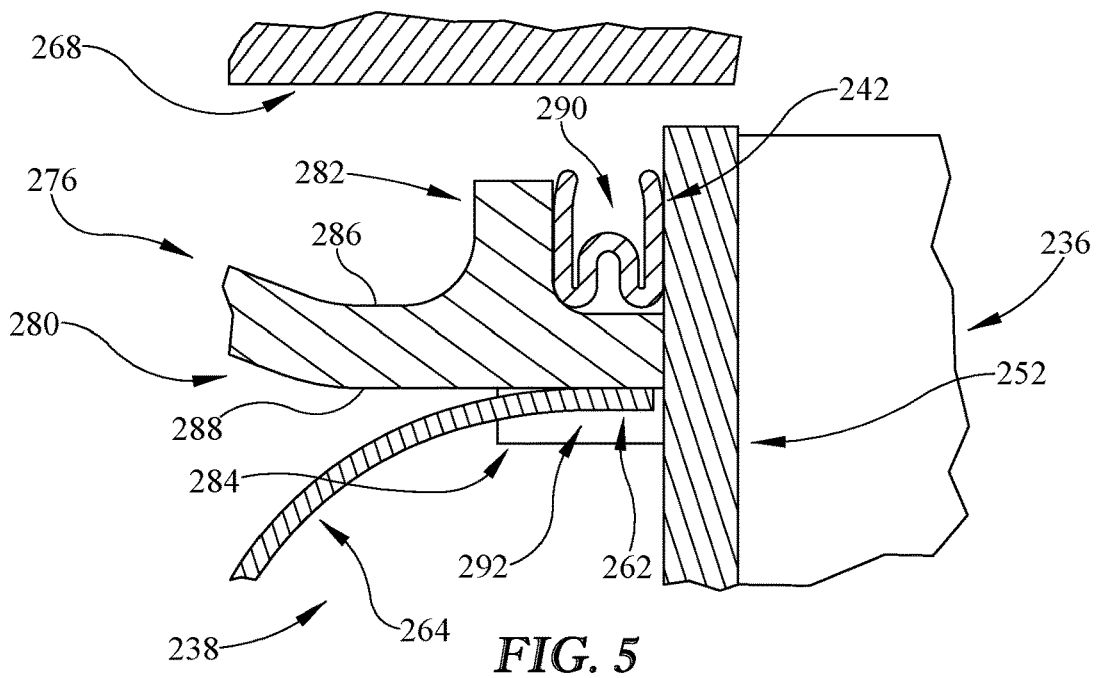
FIG. 5 is a detail view of FIG. 4 showing the housing may include an extension that engages the diffuser body to limit axial movement of the diffuser body and a notch that receives a portion of the locating baffle to block or limit circumferential rotation of the diffuser body relative to the housing.

Another embodiment of a compressor 215 in accordance with the present disclosure is shown in FIGS. 4 and 5. The compressor 215 is substantially similar to the compressor 15 shown in FIGS. 1-3 and described herein. Accordingly, similar reference numbers in the 200 series indicate features that are common between the compressor 215 and the compressor 15. The description of the compressor 15 is incorporated by reference to apply to the compressor 215, except in instances when it conflicts with the specific description and the drawings of the compressor 215.

The compressor 215 includes an impeller 220, a diffuser 222, and a housing 224 as shown in FIG. 4. The impeller 220 is mounted for rotation about the axis 11. The diffuser 222 is arranged circumferentially around the impeller 220 and configured to diffuse the compressed air received from the impeller 220 to the combustor 16. The housing 224 is arranged circumferentially about the axis 11 and is located adjacent the diffuser 222.

The diffuser 222 includes a diffuser body 236, a locating baffle 238, and seals 240, 242 as shown in FIGS. 4 and 5. The diffuser body 236 is aligned axially with an outlet 226 of the impeller 220 to capture the compressed air. The locating baffle 238 is fixed with a radial inner end 246 of the diffuser body 236 for movement with the diffuser body 236. The locating baffle 238 is engaged with the housing 224 to retain the position of the diffuser body 236 relative to the housing 224. In this way, the diffuser body 236 is limited axially and radially by the housing 224 without the diffuser 222 being coupled directly with the housing 224. The seals 240, 242 engage the diffuser body 236 at a radial outer end 244 of the diffuser body 236 to seal the between the diffuser body 236 and the housing 224.

The locating baffle 238 comprises sheet metal shaped to include a fixed end 260, a free end 262 spaced apart from the fixed end 260, and a curved portion 264 extending between the interconnecting the two ends 260, 262 as shown in FIGS. 4 and 5. The fixed end 260 is fixed with the diffuser body 236 at the radial inner end 246. The free end 262 is free to move relative to the diffuser body 236 and the housing 224. The curved portion 264 forms a diaphragm spring feature that is configured to deform elastically to allow the diffuser body 36 to move relative to the first and second portions 248, 250 of the housing 224 during use of the compressor 215.

In the illustrative embodiment, the fixed end 260 of the locating baffle 238 is fixed to a fore plate 252 of the diffuser body 236 at the radial inner end 246, while the free end 262 engages the housing 224 at the radial outer end 244 as shown in FIGS. 4 and 5. The first seal 240 is engaged with an aft plate 254 of the diffuser body 236 and the second seal 242 is engaged with the fore plate 252 of the diffuser body 236 in the illustrative embodiment.

Turning again to the housing 224, the first portion 248 of the housing 224 comprises an outer case 248 arranged circumferentially around the impeller 220 as shown in FIG. 4. The outer case 248 is shaped to include a fore outer case portion 266 and an aft outer case portion 268 as shown in FIGS. 4 and 5. The fore and aft outer case portions 266, 268 are fastened together with a fastener 270.

The fore case portion 266 is shaped to define an annular case 272, a case flange 274, and an extension 276 as shown in FIGS. 4 and 5. The annular case 272 is arranged circumferentially around the impeller 220, while the case flange 274 extends radially outward form the annular case 272 so as to be fastened to the aft case portion 268. The extension 276 extends axially aft from the flange 274 and engages the fore plate 252 of the diffuser body 236. Together the extension 276 and the combustor case 250 of the housing 224 limit axial movement of the diffuser body 236 without the diffuser 222 being coupled directly with the housing 224 or any other structural component.

The extension 276 includes an axially-extending portion 280, an outer tab 282, and an inner tab 284 as shown in FIG. 5. The axially-extending portion 280 extends axially aft from the case flange 274 of the fore case 266 and engages the fore plate 252 of the diffuser body 236. The outer tab 282 extends radially outward from an outer surface 286 of the axially-extending portion 280. The inner tab 284 extends radially inward from an inner surface 288 of the axially-extending portion 280.

The second portion 250 of the housing 224 comprises a radially extending inner combustor case 250 and a shroud 228 of the impeller 220 as shown in FIG. 4. The inner combustor case 250 is adapted to define a portion of a combustion chamber included in the combustor 16 of the gas turbine engine 10. The shroud 228 extends around the impeller blades 230 to restrict gasses from moving over the impeller blades 230 without interacting with the impeller blades 230.

In the illustrative embodiment, the axially-extending portion 280 engages the fore plate 252 to trap the diffuser body 236 between the axially-extending portion 280 and the combustor case 250. Together, the axially-extending portion 280 and the combustor case 250 limit axial movement of the diffuser 222, while the seals 240, 242 engage the diffuser body 236 on either side to seal the radial outer end 244 of the diffuser body 236.

In the illustrative embodiment, the axially-extending portion 280 and the outer tab 282 form a channel 290 with the fore plate 252 of the diffuser body 236 as shown in FIG. 5. The channel 290 extends circumferentially at least partway about the axis 11 and is sized to receive the second seal 242.

In the illustrative embodiment, the free end 262 of the locating baffle 238 engages the axially-extending portion 280 to locate the diffuser body 236 radially between the axially-extending portion 280 and the shroud 228. Together, the axially-extending portion 280 and the shroud 228 restrict radial movement of the diffuser, while the locating baffle 238 urges the diffuser body 236 toward the shroud 228 into the appropriate position relative to the impeller 220.

In the illustrative embodiment, the axially-extending portion 280 and the inner tab 284 form a notch 292 as shown in FIG. 5. The notch 292 is sized to receive the free end 262 of the locating baffle 238 to block circumferential rotation of the diffuser 222 about the axis 11. The free end 262 engages the inner surface 288 of the axially-extending portion 280 and the inner tab 284 in the notch 292 to anti-rotate the diffuser 222.

The free end 262 of the locating baffle 238 also engages the inner surface 288 of the extension 276 to block radial movement of the diffuser 222 without the diffuser 222 being coupled directly with the housing 224 or any other component. The curved portion 264 deforms to allow radial movement of the diffuser body 236 relative to the housing 224.

A method of assembling and using the compressor 215 may include several steps. To begin, the diffuser 222 may be assembled by fixing the locating baffle 238 to the diffuser body 236 for movement therewith. In the illustrative embodiment, the first end 260 is fixed to the fore plate 252 at the radial inner end 246 of the diffuser body 236. In other embodiments, the first end 260 may be fixed to fore plate 252 at another location along the radial length of the diffuser body 236.

The method may include brazing the first end 260 of the locating baffle 238 to the fore plate 252. In other embodiments, the method may include welding the first end 260 of the locating baffle 238 to the fore plate 252.

Once the locating baffle 238 is fixed with the diffuser body 236, the diffuser 222 may be arranged around the impeller 220. The diffuser 222 is circumferentially arranged around the impeller 220 so that the diffuser body 236 is aligned axially with the outlet 226 of the impeller 220. The diffuser 222 is positioned with the radial inner end 246 adjacent to the outlet of the impeller 220.

With the diffuser 222 in place, the housing 224 may be arranged adjacent to the diffuser 222. In the illustrative embodiment, the combustor case 250 is arranged adjacent to the aft plate 254 of the diffuser body 236. The fore case 266 is then arranged adjacent to the front plate 252 of the diffuser body 236 such that the axially-extending portion 280 engages the front plate 252.

In some embodiments, before the housing 224 is arranged around the diffuser 222, the seal 240 may be arranged in a slot 251 formed in the combustor case 250. As the housing 224 is assembled, bringing the combustor case 250 adjacent to the aft plate 254 of the diffuser 222, the seal 240 engages the aft plate 254 of the diffuser body 236.

Then, as the fore case 266 is brought adjacent to the aft plate 254, the seal 242 is arranged in the channel 290. The seals 240, 242 are then engaged with the corresponding plates 252, 254 after the fore and aft case portions 266, 268 are coupled together.

As the fore case 266 is arranged adjacent to the fore plate 252 of the diffuser body 236, the second end 262 of the locating baffle 238 is engaged with the axially-extending portion 280 of the outer case 248. The locating baffle 238 is engaged with the outer case 248 to bias the diffuser body 236 away from the outer case 248 of the housing 224 and toward the shroud 228 of the housing 224.

The fastener 270 is then inserted through the fore outer case 266 and the aft outer case 268. The fastener 270 is then secured so as to bring the axially-extending portion 280 into contact with the fore plate 252 and the combustor case 250. As the fastener 270 is secured, the seals 240, 242 as engage the fore and aft plates 252, 254.

The present disclosure relates to gas turbine engines having centrifugal compressors 15, 215 with radial diffusers 22, 222 following the centrifugal impeller 20, 220. Typically, radial diffusers are rigidly bolted to the surrounding structure and thus may be loaded with structural loads in additional to aerodynamic loads causing the diffusers to be designed to withstand those loads. This may cause typical diffusers to be heavier or less efficient. In some embodiments, such radial diffusers may be trapped between other structural components so as to restrain the diffuser axially and radially with a pin, or tab, to block circumferential rotation.

In the illustrative embodiments, the diffuser 22, 222 is retained in such a way so as not to drive loads and stress into the diffuser 22, 222. The diffuser 22, 222 includes a thin sheet metal, or locating baffle 38, 238, that is brazed to the diffuser body 36, 236 of the diffuser 22, 222 as shown in FIGS. 2-5. The baffle 38, 238 supports the diffuser body 36, 236 and may help seal between the diffuser 22, 222 and other structures 24, 224. The baffle 38, 238 acts as a spring and helps to keep mount loads from being driven through the diffuser 22, 222. As such, the diffuser 22 may be designed for aerodynamic performance with less concern for transmitting large force loads to or from the housing.

In the illustrative embodiment of FIGS. 2 and 3, the baffle 38 is bolted, or sandwiched, between the fore and aft outer case portions 66, 68 of the housing 24. The position may give some compliance to seal against other structures.

In the illustrative embodiment of FIGS. 4 and 5, the baffle 238 is configured to center the diffuser body 236 in the housing 224. The baffle 238 may also anti-rotate the diffuser body 236 against aerodynamic loads. In some embodiments, a pin in the diffuser body 236 may provide this anti-rotation relative to the combustion and/or the combustor case 250. The housing 224 may trap the diffuser axially; however, the baffle 238 may axially position the diffuser as well.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A compressor adapted for use in for a gas turbine engine, the compressor comprising
an impeller configured to rotate about an axis to provide compressed air,
a diffuser arranged circumferentially around the impeller and configured to diffuse the compressed air received from the impeller, the diffuser including a diffuser body aligned axially with an outlet of the impeller to capture the compressed air and a locating baffle fixed with the diffuser body for movement with the diffuser body, the diffuser body includes a fore plate, an aft plate spaced apart axially from the fore plate to define a flow path configured to receive the compressed air from the impeller, and a plurality of vanes that extend between the fore plate and the aft plate to interact with the compressed air flowing through the diffuser body, and
a housing arranged circumferentially about the axis and located adjacent the diffuser,
wherein the locating baffle is engaged with a first portion of the housing and configured to bias the diffuser body away from the first portion of the housing during use of the compressor and movement of the diffuser body is limited axially, radially, and circumferentially by the housing without the diffuser being coupled rigidly with the housing so that force loads acting on the housing are not transmitted to the diffuser,
wherein the locating baffle is configured to bias the diffuser body toward a second portion of the housing, the first portion of the housing comprises an outer case arranged circumferentially around the impeller, and the second portion of the housing comprises at least one of a radially extending inner combustor case adapted to define a portion of a combustion chamber and a shroud arranged around the impeller.

2. The compressor of claim 1, wherein the locating baffle is fixed to a radial outer end of the diffuser body, extends forward away from the diffuser body and is fastened with the outer case.

3. The compressor of claim 1, wherein the locating baffle is fixed to a radial inner end of the diffuser body and extends radially outward toward a radial outer end of the diffuser body.

4. The compressor of claim 1, wherein the locating baffle is configured to bias the diffuser radially away from the housing.

5. The compressor of claim 4, wherein the locating baffle is configured to bias the diffuser radially inward toward the impeller.

6. The compressor of claim 1, wherein the locating baffle includes a first end coupled with the diffuser body, a second end engaged with the first portion of the housing, and a curved portion located between the first end and the second end the curved portion forms a diaphragm spring that is configured to deform elastically.

7. A compressor adapted for use in for a gas turbine engine, the compressor comprising
an impeller configured to rotate about an axis to provide compressed air,
a diffuser arranged circumferentially around the impeller and configured to diffuse the compressed air received from the impeller, the diffuser including a diffuser body aligned axially with an outlet of the impeller to capture the compressed air and a locating baffle fixed with the diffuser body for movement with the diffuser body, the diffuser body includes a fore plate, an aft plate spaced apart axially from the fore plate to define a flow path configured to receive the compressed air from the impeller, and a plurality of vanes that extend between the fore plate and the aft plate to interact with the compressed air flowing through the diffuser body, and
a housing arranged circumferentially about the axis and located adjacent the diffuser,
wherein the locating baffle is engaged with a first portion of the housing and configured to bias the diffuser body away from the first portion of the housing during use of the compressor and movement of the diffuser body is limited axially, radially, and circumferentially by the housing without the diffuser being coupled rigidly with the housing so that force loads acting on the housing are not transmitted to the diffuser,
wherein the housing includes a second portion, the diffuser is located axially between the first portion and the second portion, and the compressor further includes a first seal located axially between and engaged with the diffuser and the first portion of the housing and a second seal located axially between and engaged with the diffuser and the second portion of the housing.

8. A compressor adapted for use in for a gas turbine engine, the compressor comprising
a diffuser arranged circumferentially around an axis, the diffuser including a diffuser body and a locating baffle, the diffuser body includes a fore plate, an aft plate spaced apart axially from the fore plate to define a flow path, and a plurality of vanes that extend between the fore plate and the aft plate, and
a housing arranged circumferentially about the axis and located adjacent the diffuser, the housing arranged around the diffuser so as to limit axial and radial movement of the diffuser without the diffuser being coupled rigidly with the housing,
wherein the locating baffle is engaged with the housing and configured to deform elastically to allow the diffuser body to move relative to the housing,
wherein the locating baffle includes a curved portion that defines a diaphragm configured to deform elastically.

9. The compressor of claim 8, wherein the entire diffuser body is free to move relative to the housing within a limited range of motion defined at least in part by the housing.

10. The compressor of claim 9, wherein the locating baffle is arranged to bias the diffuser body radially inward away from the housing.

11. The compressor of claim 8, wherein the housing is formed to include a notch that receives a portion of the locating baffle to limit circumferential rotation of the diffuser relative to the housing.

12. The compressor of claim 8, wherein at least the curved portion of the locating baffle comprises sheet metal.

13. The compressor of claim 8, wherein the locating baffle is coupled with a first portion of the housing for movement with the first portion of the housing.

14. The compressor of claim 8, wherein the locating baffle includes a fixed end that is fixed with the diffuser body and a free end that is spaced apart from the fixed end and free to move relative to the diffuser body and the housing.

15. The compressor of claim 8, wherein a first portion of the housing comprises an outer case arranged circumferentially around the diffuser and a second portion of the housing comprises at least one of a radially extending inner combustor case adapted to define a portion of a combustion chamber and a shroud arranged around an impeller.

* * * * *